(12) United States Patent
Namuduri et al.

(10) Patent No.: US 9,926,146 B2
(45) Date of Patent: Mar. 27, 2018

(54) MAGNETODYNAMIC APPARATUS AND METHOD FOR SEPARATING NON-FERROUS CONDUCTIVE BLANKS

(71) Applicant: GM GLOBAL TECHNOLOGY OPERATIONS LLC, Detroit, MI (US)

(72) Inventors: Chandra S. Namuduri, Troy, MI (US); Thomas W. Nehl, Shelby Township, MI (US); James J. Abramczyk, Clarkston, MI (US); Kenneth J. Shoemaker, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/364,547

(22) Filed: Nov. 30, 2016

(65) Prior Publication Data

US 2017/0158437 A1    Jun. 8, 2017

Related U.S. Application Data

(60) Provisional application No. 62/263,094, filed on Dec. 4, 2015, provisional application No. 62/263,097, filed (Continued)

(51) Int. Cl.
| | |
|---|---|
| *B25J 15/06* | (2006.01) |
| *B65H 3/16* | (2006.01) |
| *B66C 1/04* | (2006.01) |
| *B65G 59/04* | (2006.01) |
| *B25J 9/16* | (2006.01) |
| *H02K 15/02* | (2006.01) |

(Continued)

(52) U.S. Cl.
CPC ............ *B65G 59/04* (2013.01); *B25J 9/1687* (2013.01); *B65G 54/02* (2013.01); *H02K 15/02* (2013.01); *H02K 41/025* (2013.01)

(58) Field of Classification Search
CPC ... Y10S 271/901; B65G 59/04; B65G 59/045; B65G 54/02; B21D 43/24; H01F 7/0247
USPC ................ 271/145, 18.1, 901; 29/744, 810; 335/288, 302
See application file for complete search history.

(56) References Cited

U.S. PATENT DOCUMENTS

| | | | | |
|---|---|---|---|---|
| 2,474,141 | A | * | 6/1949 | Chatterton ............. B21D 43/24 271/18.1 |
| 2,973,959 | A | * | 3/1961 | Stolk .................... B65G 59/045 271/18.1 |

(Continued)

*Primary Examiner* — Gregory W Adams
(74) *Attorney, Agent, or Firm* — Quinn IP Law

(57) ABSTRACT

A magnetodynamic apparatus for separating conductive non-ferrous blanks includes at least one magnet positioned adjacent to a stack of the blanks and configured to generate a magnetic field in a first direction with respect to a major surface of an uppermost blank within the stack. The apparatus includes an actuator device for positioning the magnet with respect to the stack during production of an electric current in a second direction along the major surface. The second direction is normal to the first direction such that a magnetic separation force is generated in a third direction normal to the first and second directions. The separation force is sufficient for magnetically separating the uppermost blank from remaining blanks in the stack. The magnets may be rotated on a rotor or held stationary. The electric current may be induced or directly injected into the uppermost blank.

15 Claims, 3 Drawing Sheets

Related U.S. Application Data on Dec. 4, 2015, provisional application No. 62/363,539, filed on Jul. 18, 2016.

(51) Int. Cl.
*H02K 41/025* (2006.01)
*B65G 54/02* (2006.01)

(56) References Cited

U.S. PATENT DOCUMENTS

| | | | | |
|---|---|---|---|---|
| 3,353,822 A * | 11/1967 | Dangelmaier | ......... | B21D 43/24 271/18.1 |
| 3,395,912 A * | 8/1968 | Tappolet | ................ | B21D 43/24 257/E21.544 |
| 4,387,508 A * | 6/1983 | Wyatt | ..................... | H01F 41/02 271/193 |
| 4,815,916 A * | 3/1989 | Beck | ..................... | B65G 59/04 271/154 |
| 4,946,341 A * | 8/1990 | Parsley | ................ | B65G 59/045 271/155 |
| 5,018,939 A * | 5/1991 | Kishi | ..................... | B21D 43/20 271/18.1 |
| 5,631,618 A * | 5/1997 | Trumper | ............. | G03F 7/70758 104/286 |
| 5,651,541 A * | 7/1997 | Prime | ..................... | B65H 3/60 271/18.1 |
| 5,669,156 A * | 9/1997 | Vejchoda | ..................... | F26B 15/18 198/381 |
| 6,146,086 A * | 11/2000 | Snell | ..................... | B65G 54/02 198/465.1 |
| 6,481,706 B1 * | 11/2002 | Gaeddert | ............... | B65G 59/04 271/105 |
| 6,746,063 B1 * | 6/2004 | Sanchez | ................ | B21D 43/24 271/18.1 |
| 2010/0101879 A1 * | 4/2010 | McVickers | ......... | B60L 11/1822 180/65.51 |

* cited by examiner

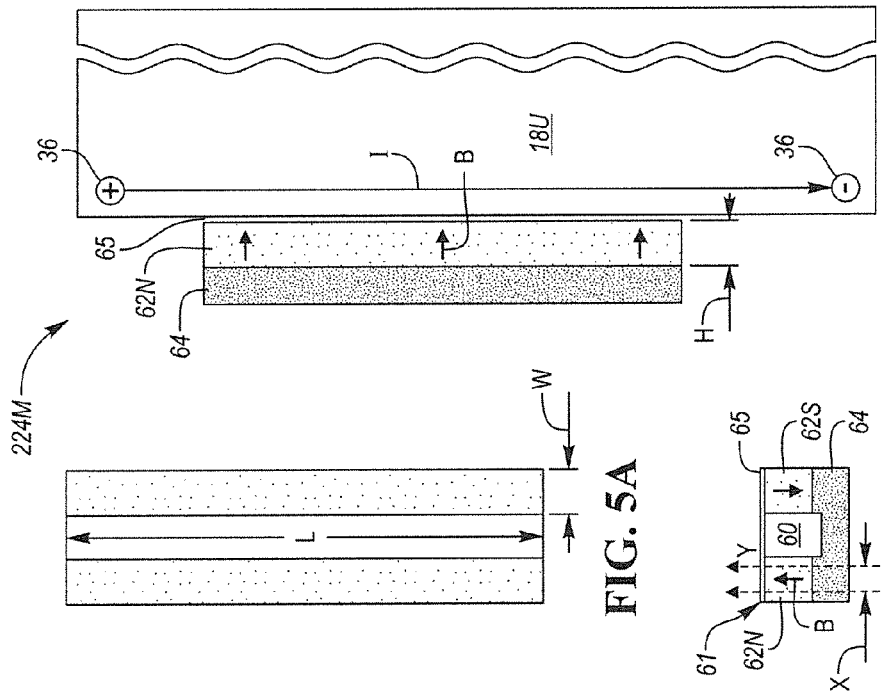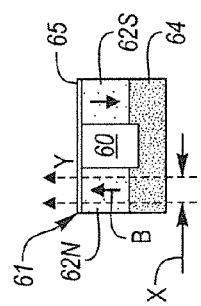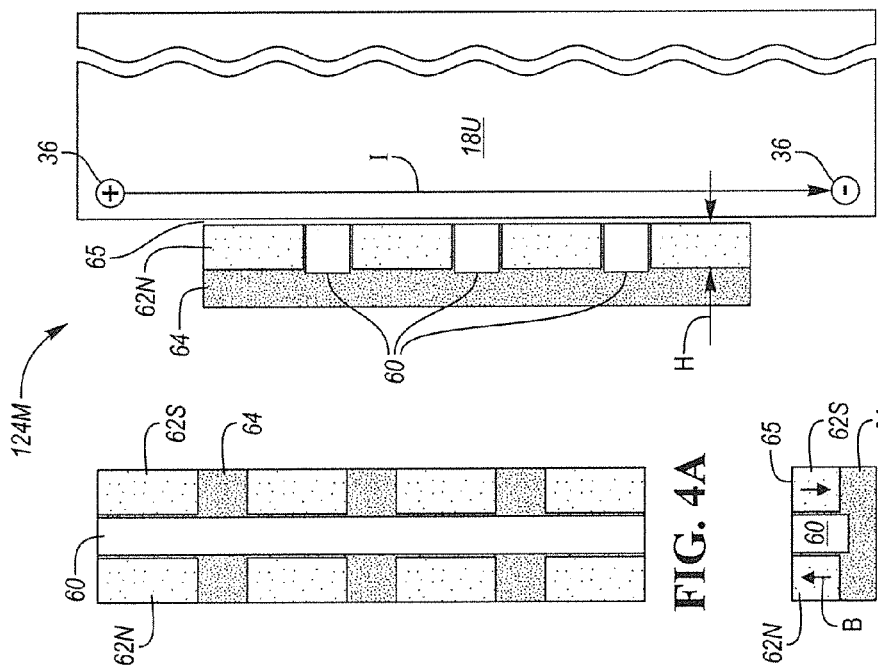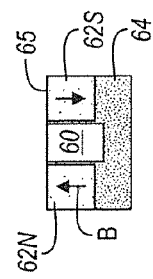

ns of the sta
MAGNETODYNAMIC APPARATUS AND METHOD FOR SEPARATING NON-FERROUS CONDUCTIVE BLANKS

CROSS-REFERENCE TO RELATED APPLICATIONS

This application claims the benefit of U.S. Provisional Application No. 62/263,094, filed on Dec. 4, 2015, U.S. Provisional Application No. 62/263,097, filed on Dec. 4, 2015, and U.S. Provisional Application No. 62/363,539, filed on Jul. 18, 2016, all of which are incorporated by reference in their respective entireties and for all purposes.

INTRODUCTION

The present disclosure relates generally to automated systems for handling non-ferrous, electrically conductive objects. More specifically, aspects of this disclosure pertain to automated apparatuses, systems, and related methods for magnetodynamically separating non-ferrous, electrically conductive blanks during handling and processing. In an example stamping operation, such blanks are automatically fed into a stamping press via operation of a material handling robot. A tool and die surface of the stamping press forms the received blanks into a desired shape. To facilitate the stamping operation, a stack of blanks is positioned in proximity to the stamping press. An end-effector of the robot is then moved into position above the stack of blanks. The uppermost blank is grasped and lifted from the stack via the end-effector and thereafter fed into the stamping press.

SUMMARY

The present disclosure pertains to a magnetodynamic apparatus and related methods for separating aluminum or other non-ferrous, electrically conductive panels or blanks. Such blanks may stacked and staged near a stamping press in an example stamping operation, with the blanks removed one at a time from the stack and fed into the press by a material handling robot. The disclosed apparatus generates a magnetic force that repels a corner, edge, or other portion of an uppermost blank from the rest of the stack to facilitate grasping and lifting of the upmost blank by an end-effector of the robot.

An example embodiment of the apparatus includes a magnet, a controller, and an actuator device. The magnet is positioned adjacent to the stack of blanks and configured to generate a stationary magnetic field in a first direction with respect to a major surface of an uppermost blank within the stack. The controller is programmed to command an electric current in a second direction along the major surface of the uppermost blank, with the second direction being normal to the first direction. The actuator device, which is connected to the magnet, is operable for positioning the magnet with respect to the stack concurrently with the commanded electric current. In this manner, a magnetic separation force is generated in a third direction that is normal to the first and second directions, and at a level that is sufficient for separating the portion of the uppermost blank from the stack The magnet may include a plurality of permanent magnets connected to a rotor and arranged with alternating north and south magnetic poles. In such an embodiment, the actuator device may be configured to rotate the rotor about an axis of rotation to generate the magnetic field in the first direction and induce the flow of electric current.

The controller may be configured to command a change in a relative position of the magnet with respect to the stack via transmission of position control signals to the actuator device. A housing may contain the rotor, in which case the actuator device may be configured to automatically adjust a position of the housing with respect to an edge of the stack in response to receipt of the position control signals.

The apparatus may include a position sensor in communication with the controller, as well as with a material handling robot and the actuator device. The controller may be programmed to receive a position of the material handling robot from the position sensor and to transmit control signals to the actuator device to produce the electric current only when the position of the material handling robot is within a calibrated distance of the uppermost blank.

In other embodiments, the apparatus may include a direct current (DC) voltage source, a pair of electrical conductors, and a pair of electrical contacts that are electrically connected to the DC voltage source via the pair of electrical conductors. The electric current may be produced by directly injecting the electric current into the uppermost blank when the leads come into direct contact with the major surface of the uppermost blank.

The apparatus may include a switch, with the electric current injected into the uppermost blank when the switch is closed after the electrical leads come into direct contact with the major surface of the uppermost blank. The switch may be embodied as a spring-loaded switch.

The DC voltage source in a particular example embodiment provides a voltage of about 12VDC and a current of about 100 amps.

The magnet may be embodied as a segmented bar magnet assembly with a non-magnetic spacer, magnet north and south poles, and back-iron material.

A method is also disclosed for separating conductive non-ferrous blanks. In an example embodiment, the method may include positioning a magnet adjacent to a stack of the blanks and generating a stationary magnetic field via the magnet in a first direction with respect to a major surface of an uppermost blank of the stack. The method may also include determining if an end-effector of a material handling robot is within a calibrated distance or proximity of the major surface of the uppermost blank, as well as producing, via transmission of position control signals to an actuator device, an electric current in a second direction along the major surface of the uppermost blank when the end-effector is within the calibrated proximity. As noted above, the second direction is normal to the first direction. Additionally, the method may include controlling a position of the magnet relative to the stack via the actuator device during flow of the electric current such that a magnetic separation force is generated in a third direction that is normal to the first and second directions. The generated force is sufficient for separating a portion of the uppermost blank from the stack.

Another method for separating electrically conductive, non-ferrous blanks includes generating, via one or more magnets positioned adjacent to a stack of the blanks, a stationary magnetic field in a first direction with respect to a major surface of an uppermost blank of the stack. The method in this embodiment includes producing an electric current in a second direction along the major surface of the uppermost blank by inducing or by directly injecting the electric current in the major surface, with the second direction being normal to the first direction. Additionally, the method includes generating a magnetic separating force as a product of the stationary magnetic field and the electric current to separate the uppermost blank from remaining blanks in the stack. The method in this particular embodiment may also include grasping and lifting the separated uppermost blank having the separated corner using an end-effector of a material handling robot.

The above-noted features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIGS. 4A-C are respective schematic top, end, and side-view illustrations of an example bar magnet assembly usable with the embodiment of FIG. 2.

FIGS. 5A-C are respective schematic top, end, and side-view illustrations of an alternative example bar magnet assembly usable in the embodiment of FIG. 2.

Figure 1:
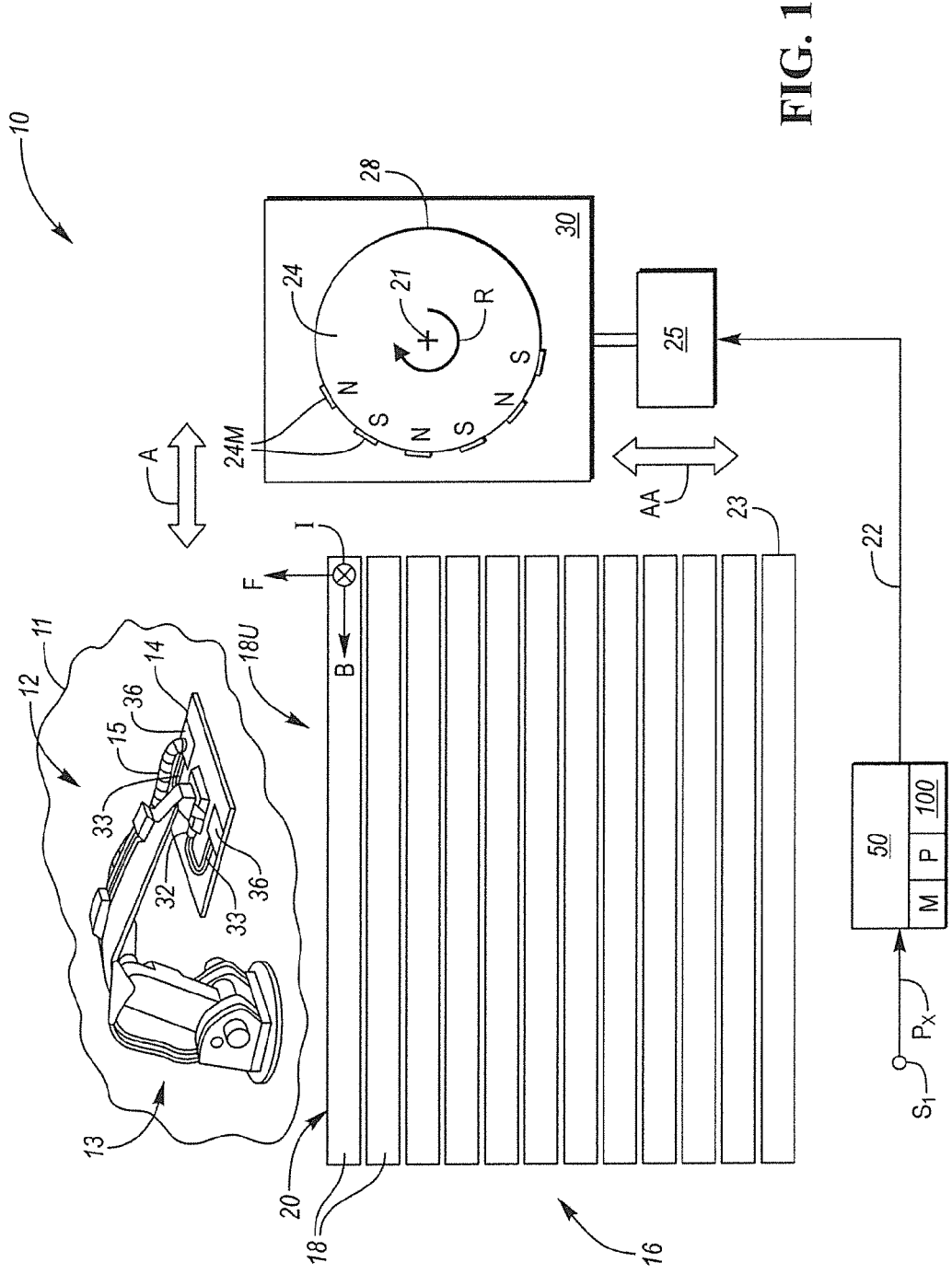
FIG. 1 is a schematic illustration of a magnetodynamic apparatus for separating electrically conductive, non-ferrous blanks from a stack of such blanks.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the drawings. Rather, the disclosure is to cover all modifications, equivalents, permutations, combinations, sub-combinations, and alternatives falling within the spirit and scope of the disclosure as defined by the appended claims.

DETAILED DESCRIPTION

Shown in the drawings and described in detail herein are representative embodiments of the disclosure. To that extent, elements and limitations that are disclosed but not explicitly set forth in the claims are not intended to be incorporated into the claims, singly or collectively, either by implication or inference. For purposes of the present detailed description, unless specifically disclaimed, the singular includes the plural and vice versa, the words "and" and "or" shall be both conjunctive and disjunctive, "all" means "any and all", "any" means "any and all", "including", "comprising", and "having" mean "including without limitation." Moreover, words of approximation, such as "about," "almost," "substantially," "approximately," and the like are used herein in the sense of "at, near, or nearly at," or "within 3-5% of," or "within acceptable manufacturing tolerances," or any logical combination thereof.

Figure 3:
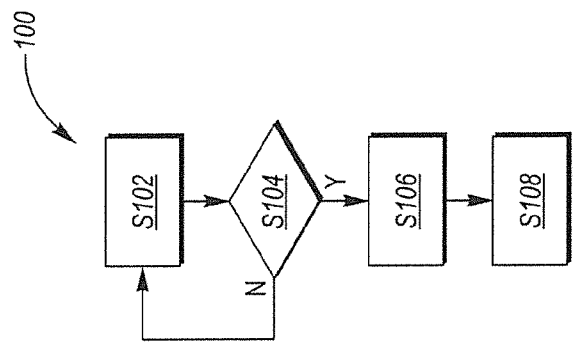
FIG. 3 is a flow chart depicting an example method for magnetodynamically separating electrically conductive, non-ferrous blanks via the apparatus shown in FIGS. 1 and 2.

Referring to the drawings, wherein like numerals indicate like components throughout the several views, a magnetodynamic apparatus 10 is shown in FIG. 1. The apparatus 10 may be used as part of an example stamping operation in a manufacturing operation using non-ferrous conductive blanks 18, i.e., panels or sheets of an electrically-conductive, non-ferrous/non-magnetic material such as aluminum, magnesium, laminated plastic, and/or composite materials having a conductive layer. The embodiments of FIGS. 1 and 2, both of which may be controlled via an example method 100 as shown in FIG. 3, are intended to eliminate the need for compressed air, dimple patterns, or other approaches facilitating separation of the blanks 18 in stamping or other operations.

As noted generally above, an example stamping press operation may benefit from use of a material handling robot 12, only portions of which are shown in FIG. 1 via a schematic inset 11 for illustrative simplicity. Therefore, the apparatus 10 may optionally include such a robot 12. The robot 12 may include a robot arm 13 and an end-effector 14. In the particular configuration shown, the end-effector 14 may include suction cups supplied with a vacuum via a hose 15 such that the end-effector 14 applies a suction force and thereby securely grasps and lifts an uppermost blank 18U from a stack 16 of identically configured blanks 18.

The end-effector 14 may be alternatively embodied as a multi-fingered gripper or another application-suitable end-effector. The uppermost blank 18U is lifted by the end-effector 14 and fed into a stamping press (not shown), with the robot arm 13 pivoting back and forth between the stamping press and the stack 16 until all of the blanks 18 in the stack 16 have been sequentially fed into the press. The apparatus 10 may include an optional direct current (DC) voltage source 32, e.g., a low-voltage auxiliary battery, a pair of electrical conductors 33, and a pair of electrical contacts 36 such as conductive pads or contact surfaces, with such structural elements used in a particular manner in the alternative embodiment of FIG. 2. The DC voltage source 32 may be connected to the end-effector 14 or to another portion of the robot 12 in different embodiments.

As part of the apparatus 10 of FIG. 1, one or more magnets 24M may be positioned adjacent to the stack 16. The magnets 24M may be permanent magnets or electromagnets depending on the embodiment. A magnetic force (F) is equal to the product of an electric current (I), a magnetic field (B), and a length (L) of a given conductor, in this instance the uppermost blank 18U, i.e., $F = B \times I \times L$. This principle is harnessed via the method 100 in a particular manner so as to produce a targeted "blank fanning" effect in which the generated magnetic force (F) is produced in a controlled and targeted manner to separate the blanks 18.

More specifically, the apparatus 10 and method 100 are used to separate a corner, edge, or other portion of the uppermost bank 18U from the remaining blanks 18 in the stack 16, and particularly from an immediately adjacent blank 18. That is, a problem to be avoided is the inadvertent lifting of more than the uppermost blank 18U, and therefore clean separation of a corner, edge, or other portion of the uppermost blank 18U allows the end-effector 14 to lift and feed only the uppermost blank 18U. The embodiments of FIGS. 1 and 2 use the above-noted principle to produce the desired blank fanning effect, with FIG. 1 depicting use of a rotor 24 having a perimeter surface 28 to induce a flow of the electric current (I) in the uppermost blank 18U and FIG. 2 using the DC voltage source 32 to directly inject the electric current (I) into the uppermost blank 18U.

With respect to the example rotating magnetic field embodiment of FIG. 1, the magnets 24M are connected to or arrayed around the perimeter surface 28 of the rotor 24 to establish a stationary magnetic field with respect to an outer periphery of the rotor 24. The rotor 24 is then rotated at a controlled speed in close proximity to an edge 23 of the stack 16. Rotation of the rotor 24 may be used to induce the electric current (I) along a major surface 20 of the uppermost blank 18U, i.e., into the page from the perspective of FIG. 1, and ultimately generates the magnetic force (F) at a magnitude that is sufficient for separating the uppermost blank 18U from the remainder of the stack 16. To achieve the desired magnetic force (F), a plurality of the magnets 24M arranged with alternating north (N)-south (S) polarity may be connected to the outer periphery of the rotor 24, e.g., a ferrous cylinder, disc, or drum, or any other structure that rotates about an axis of rotation 21. Rotation of the rotor 24 about the axis of rotation 21 results in generation of the magnetic field (B) in a first direction with respect to the major surface 20 of the uppermost blank 18U, that is, away from the rotor 24 and into the uppermost blank 18U.

As part of the apparatus 10, an actuator device 25, e.g., a combined solenoid device and motor assembly, may be operatively connected to the magnets 24M. In some embodiments, the actuator device 25 may be used to position the rotor 24 and/or the magnet(s) 24M with respect to the stack 16, or maintain a calibrated relative position, concurrently with/during commanded flow of the electric current (I). In the embodiment of FIG. 1, the actuator device 25 may rotate the rotor 24 about the axis of rotation 21 as indicated by arrow R. The actuator device 25 may automatically position a housing 30 containing the rotor 24, or may position the rotor 24 directly, in a vertical and/or horizontal direction with respect to the edge 23 of the stack 16 as indicated by double-headed arrows A and AA, respectively.

The electric current (I) is produced, i.e., directly injected or induced depending on the embodiment, in a second direction along the major surface 20 of the uppermost blank 18U, which is directly into the uppermost blank 18U as viewed from the perspective of FIG. 1. That is, the electric current (I) is produced in a direction that is perpendicular or normal to the direction of the magnetic field (B), such that a magnetic separation force (F) as described above is generated as a separating magnetic force in a third direction that is normal to the major surface 20 of the uppermost blank 18U. The separation force (F), which is predetermined in its magnitude as set forth below, is sufficient to magnetically separate the uppermost blank 18U from the remainder of the blanks 18 in the stack 16.

The magnitude of the magnetic separation force (F) depends on the rotational speed of the rotor 24, the magnetic field strength of the magnets 24M, the diameter of the rotor 24, and the size of any air gap separating the stack 16 from the closest relative point on the rotor 24. Therefore, the force (F) resulting from the electric current (I) and the magnetic field (B) may be carefully tuned to the specifications of the blanks 18. Using an illustrative example, a stack 16 may include about 350-400 blanks 18 constructed of aluminum, each approximately 0.90-1.0 mm thick and about 6.50-7.0 kg in weight. A typical rectangular blank 18 may have major dimensions of about 1.475 m×1.835 m. For aluminum blanks 18 having the above specifications, a force (F) of about 17 Newtons is required at each corner of the blank 18 to facilitate an amount of separation sufficient for lifting by the end-effector 14. For instance, a separation of the uppermost blank 18U may be achieved of about 10-20 mm and not more than the width of the magnets 24M, i.e., less than about 50 mm. Based on this, the required magnetic field (B) and/or electric current (I) used to help separate the uppermost blank 18U from the remainder of the stack 16 may be readily determined, as will be appreciated by one of ordinary skill in the art.

As part of an example stamping operation, an optional position sensor S1 may be used to detect a position of the end-effector 14 with respect to the uppermost sheet 18U, with the detected position (arrow Px) transmitted to a controller 50. The controller 50 may be programmed to command a flow of the electric current (I) in or along the major surface of the uppermost blank 18U within the stack 16, in a direction that is normal to the magnetic field. Position sensor S1 may be any suitable position sensor, such as but not limited to a Hall effect sensor or rotary encoder. The controller 50, e.g., one or more computer devices having sufficient memory (M), a processor (P), and instructions embodying the method 100 as set forth below with reference to FIG. 3, may be in communication with the material handling robot 12, for instance with a separate robot controller, and programmed to receive the position (arrow Px). The controller 50 can then transmit control signals (arrow 22) to the actuator device 25 to cause production of the electric current (I) only when the position (arrow Px) indicates that the end-effector 14 is within a calibrated distance of the upmost blank 18. In this way, positioning and speed control of the rotor 24 with respect to the stack 16 may be closely coordinated with the overall motion of the material handling robot 12, e.g., via closed-loop or open-loop feedback control. Likewise, the control signals (arrow 22) may position the rotor 24 with respect to the stack 16, such as by gradually lowering the rotor 24 as the blanks 18 are consumed by the stamping process and the height of the stack 16 decreases.

Figure 2:
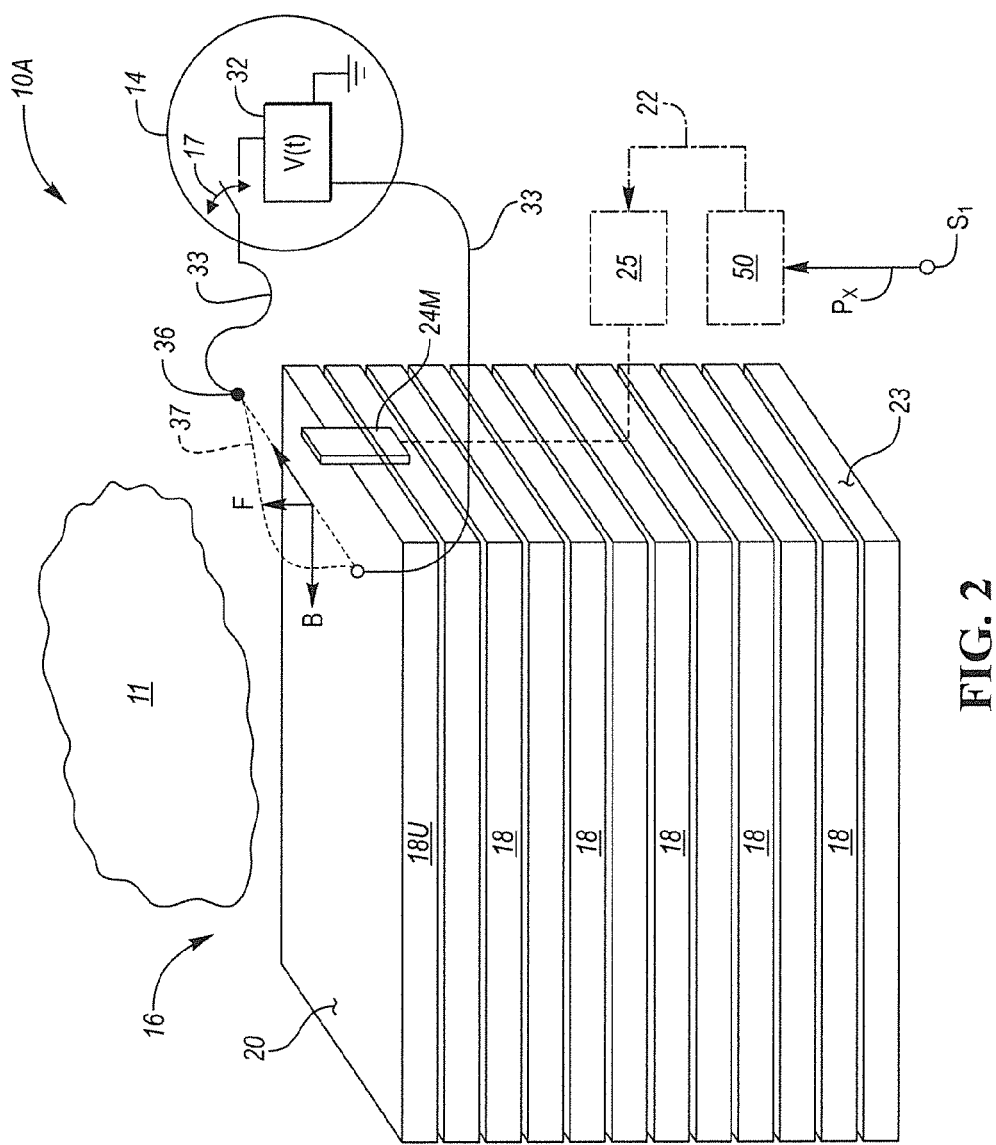
FIG. 2 is a schematic illustration of an alternative configuration to that which is depicted in FIG. 1.

FIG. 2 depicts an alternatively configured magnetodynamic apparatus 10A in which the electric current (I) is directly injected as a DC current into the uppermost blank 18U in the presence of a properly-oriented static magnetic field. The actuator device 25 of FIG. 1 may be used to change or maintain the relative positioning of the magnet(s) 24M with respect to the stack 16, e.g., in response to transmission of the position control signals. The static flux of one or more of the magnets 24M may be created using an array of permanent magnets or electromagnets in different embodiments. For simplicity, supporting structure maintaining a relative position of the magnets 24M and the stack 16 is omitted from FIG. 2. However, a rack or a tower of non-ferrous/non-magnetic material may be positioned at the corners of the stack 16 for this purpose.

The apparatus 10A may include a DC voltage source 32 with an electric potential V(t), as well as the pair of electrical conductors 33 terminating in the electrical contacts 36 as noted above. The electrical conductors 33 and the electrical contacts 36 are electrically connected to the DC voltage source 32. When the end-effector 14 is not in contact with the uppermost blank 18U, an open circuit exists between the electrical contacts 36. The actuator device 25 in this embodiment is operable for injecting the electric current (I) into the uppermost blank 18U in the second direction, i.e., perpendicular with respect to the direction of the magnetic field (B) as shown along the surface 20, whenever the electrical contacts 36 directly contact the major surface 20 of the uppermost blank 18U and close a circuit with the DC voltage source 32, thereby delivering the electric current (I) at the low voltage of the DC voltage source 32.

To facilitate the embodiment of FIG. 2, the DC voltage source 32 and electrical leads 36 may be connected to the end-effector 14 of the material handling robot 12 used to move the uppermost blank 18U. For example, the DC voltage source 32, electrical conductors 33, and electrical contacts 36 may be connected to the end-effector 14, with contact between the electrical leads 36 and the surface 20 completing an electrical circuit, either automatically or via subsequent closing of an optional switch 17, thereby causing the electric current (I) to flow within the uppermost blank 18U. The DC voltage source 32 may be a relatively high-current, low-voltage device, e.g., 100 A at 12VDC. Thus, the embodiment of FIG. 2 includes using a stationary magnetic field (B) and the actuator device 25 to directly inject the DC electric current (I) in the uppermost blank 18U which, when interacting with the static magnetic field (B) having flux lines 37 generates the required force (F) for magnetic separation of the blanks 18.

A possible embodiment of the magnet 24M described generally above is shown as an example magnet 124M in FIGS. 4A-C, which are intended to be illustrative and therefore not to scale. The magnet 124M may be configured as a segmented bar magnet assembly with an optional non-magnetic spacer 60, magnet north and south poles 62N and 62S, and back-iron material 64. As shown in FIG. 4B, the non-magnetic spacer 60, e.g., aluminum, stainless steel, or another suitable material, may extend into the back-iron material 64 between the north and south poles 62N and 62S. The magnet 124M is then positioned adjacent to the stack 16 of FIG. 2 such that the back-iron material 64, as shown in FIG. 4C, is oriented away from the stack 16, with the uppermost blank 18U of the stack 16 depicted in FIG. 4C. The north and south poles 62N and 62S, respectively, are oriented immediately adjacent to the stack 16 such that a surface 65 of the north and south poles 62N and 62S is positioned within a calibrated distance of the stack 16, with the calibrated distance forming the air gap noted above.

The magnet 124M of FIGS. 4A-C may be alternatively embodied as a magnet 224M as shown in FIGS. 5A-C, i.e., as a single-bar magnet assembly. That is, the plurality of north and south poles 62N and 62S in the segmented magnet configuration of FIG. 4A may be alternatively configured as single elongated north and south poles 62N and 62S. As shown in FIG. 5B, a thin surface layer 61 of the non-magnetic spacer 60, which again is not to scale, may cover the surface 65 of the respective north and south pole 62N and 62S as an added protective layer. Such a thin surface layer 61, while omitted from FIG. 4A for illustrative simplicity, may also be used with the segmented embodiment of FIGS. 4A-C.

The example configurations depicted in FIGS. 4A-5C are intended to achieve a fairly uniform vertical flux density normal to the magnet surface. In an example application for a stack 16 of aluminum blanks 18, the flux density normal to the magnet surface may exceed 0.25 T at a distance (Y) of about 1 cm over a minimum distance (X) of 2 cm, with the X and Y dimensions shown in FIG. 5B. For instance, for a magnet 124M or 224M used to separate an aluminum blank 18, the magnet 124M or 224M may be constructed of neodymium alloy (N52) and have an overall axial length (L) of about 100 cm, a pole width (W) of about 10 cm, and a pole height (H) of about 5 cm, with a non-magnetic spacer 60 having a width of about 5 cm and a height of about 3 cm. The thin surface layer 61 may be about 0.5 mm-2 mm in thickness, and the back-iron material 64 may be about 3 cm thick under the permanent magnet poles. The magnetic field strength in such an embodiment may exceed 1.2 T and the magnet 124M or 224M may have a magnetic energy of greater than 50 Megagauss-Oersted (MGOe) in a 50° C. operating environment. Other configurations may be envisioned without departing from the intended inventive scope.

Referring to FIG. 3, an example embodiment of the method 100 for magnetodynamically separating the electrically conductive, non-ferrous blanks 18 as described above begins with step S102, wherein one or more magnets 24M are positioned adjacent to the stack 16 of blanks 18. For instance, a pallet containing the stack 16 may be positioned on a non-metallic base such that the edge 23 of the stack 16 faces the magnet(s) 24M. The distance between the stack 16 and the magnets 24M, along with other factors as noted above, is set based on the force (F) required for magnetic separation. Step S102 further includes generating the stationary magnetic field (B) via the magnets 24M in a first direction with respect to the major surface 20 of the uppermost blank 18U within the stack 16. The method 100 proceeds to step S104 once the magnets 24M are properly positioned and are generating the magnetic field (B).

Step S104 may entail determining if the end-effector 14 of the robot 12 shown in FIG. 1 is in a close calibrated proximity to the surface 20 of the uppermost blank 18U, e.g., within 5-10 centimeters in a non-limiting example embodiment. Step S104 may entail processing the position signals (arrow Px) via the controller 50 to determine if the end-effector 14 is about to make contact with the surface 20 of the uppermost blank 18U. The method 100 proceeds to step S106 when such contact is imminent.

At step S106, the actuator device 25 is activated or otherwise controlled to control a position of the magnets 24M relative to the stack 16 and produce the electric current (I) in a second direction along the major surface 20 of the uppermost blank 18U. As noted above, the second direction is normal to the direction of the stationary magnetic field (B). Step S106, in the example embodiment of FIG. 1, may include commanding rotation of the rotor 24 about the axis of rotation 21 at a calibrated rotational speed in order to produce the required force (F). In the embodiment of FIG. 2, step S106 may include connecting the electrical contacts 36 to the uppermost blank 18U to close an electrical circuit with the DC voltage source 32, either automatically by contact or via closing of the optional switch 17 via the control commands arrow 22 to generate the required force (F). Alternatively, the electrical contacts 36 may be spring-loaded in a possible embodiment, and thus the switch 17 may close automatically when the end-effector 14 exerts sufficient suction or grasping force on the surface 20. The method 100 then proceeds to step S108.

Step S108 may entail controlling a position of the magnets 24M relative to the stack 16 via the actuator device 25, e.g., while the material handling robot 12 is in the process of feeding a blank 18 into a stamping press. Step S108 occurs during production of the electric current (I) such that the force (F) is generated in a third direction normal to the first and second directions at a magnitude sufficient for magnetically separating the uppermost blank 18U from remaining blanks 18 in the stack 16.

That is, as the height of the stack 16 gradually decreases with the removal of each successive blank 18, the actuator device 25 may automatically adjust the relative positioning of the magnets 24M with respect to the stack 16 using the control signals 22 from the controller 50. For instance, the rotor 24 or housing 30 of FIG. 1 or the magnet(s) 24M of FIG. 2 may be gradually lowered relative to the stack 16 by operation of the actuator device 25 as needed. In the embodiment of FIG. 2, for instance, the magnet 24M may be lowered via operation of the actuator device 25. As part of step S108, the method 100 may include grasping and lifting the separated uppermost blank 18U from the stack 16 using the end-effector 14 and material handling robot 12 of FIG. 1.

Using the above-described approaches for separating conductive non-ferrous blanks 18, one of ordinary skill in the art may generate a stationary magnetic field and induce, inject, or otherwise produce an electric current along the surface of the uppermost blank 18U, with the directions of the stationary magnetic field and the electric current being normal, i.e., orthogonal, to each other. The force generated as a product of the stationary magnetic field and electric current are then used to facilitate separation of the uppermost blank 18U from any remaining blanks 18 in the stack 16. While different example embodiments are described above with reference to FIGS. 1-5C, those of ordinary skill in the art will appreciate that other configurations may be envisioned within the scope of the disclosure to generate such a force and apply it to non-ferrous, electrically-conductive blanks such as the blanks 18 to facilitate separation during stamping or other processes.

Separation of ferrous blanks such as steel sheet metal panels may be achieved using static magnetic fields of the same polarity. However, such an approach relies on the magnetic properties of the ferrous blanks and thus cannot be used with non-ferrous conductive blanks such as aluminum and magnesium. The present approach is therefore intended to address this particular challenge as an alternative to separation processes such as injection of compressed air between adjacent sheets or use of dimple patterns along the edges of the blanks to aid in such air-based separation techniques. Additionally, as blanks are often coated with lubricants, a capillary effect tends to adhere adjacent blanks to each other. The capillary effect is exacerbated when the blanks are cold, e.g., during winter shipping, due to an increase in lubricant viscosity. The present approach can be used to help offset the capillary effect with lubricated blanks. These and other benefits will be recognized in view of this disclosure.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A magnetodynamic apparatus for separating conductive non-ferrous blanks arranged in a stack, the magnetodynamic apparatus comprising:
a rotor positioned adjacent to the stack, and having a perimeter surface and an axis of rotation,
a plurality of magnets arranged on the perimeter surface of the rotor with alternating north and south magnetic poles, and configured to generate a magnetic field in a first direction with respect to a major surface of an uppermost blank within the stack;
a controller programmed to command a flow of an electric current in a second direction along the major surface of the uppermost blank, wherein the second direction is normal to the first direction; and
an actuator device connected to the rotor and configured to rotate the rotor about the axis of rotation, concurrently with the commanded flow of electric current, to thereby generate the magnetic field in the first direction, such that a magnetic separation force is generated in a third direction normal to the first and second directions, and at a level sufficient for separating a portion of the uppermost blank from the stack.

2. The magnetodynamic apparatus of claim 1, wherein the controller is configured to command a change in a relative position of the plurality of magnets with respect to the stack via transmission of position control signals to the actuator device.

3. The magnetodynamic apparatus of claim 2, further comprising a housing containing the rotor, wherein the actuator device is configured to automatically adjust a position of the housing with respect to an edge of the stack in response to the position control signals.

4. The magnetodynamic apparatus of claim 1, further comprising a position sensor in communication with the controller, a material handling robot, and the actuator device, wherein the controller is programmed to receive a position of the material handling robot from the position sensor and transmit control signals to the actuator device to thereby produce the electric current only when the position of the material handling robot is within a calibrated distance of the uppermost blank.

5. A method of separating conductive non-ferrous blanks, the method comprising:
positioning a magnet adjacent to a stack of the blanks;
generating a stationary magnetic field, via the magnet, in a first direction with respect to a major surface of an uppermost blank of the stack;
determining if an end-effector of a material handling robot is within a calibrated proximity to the major surface of the uppermost blank;
producing, via transmission of position control signals to an actuator device, an electric current in a second direction along the major surface of the uppermost blank when the end-effector is within the calibrated proximity, wherein the second direction is normal to the first direction; and
controlling a position of the magnet relative to the stack via the actuator device during production of the electric current such that a force is generated in a third direction, normal to the first and second directions, that is sufficient for separating a portion of the uppermost blank from the stack.

6. The method of claim 5, wherein determining if an end-effector of a robot is within the calibrated proximity of the major surface of the uppermost blank includes measuring a position of the end-effector via a position sensor, transmitting position signals from the position sensor to a controller, and processing the position signals via the controller to determine if the end-effector is about to make contact with the major surface of the uppermost blank.

7. The method of claim 5, wherein producing the electric current includes connecting the electrical contacts to the uppermost blank to thereby connect a direct current (DC) voltage source to the major surface and cause the electric current to flow in the major surface.

8. The method of claim 5, wherein the electrical contacts are spring-loaded and a switch closes automatically when the end-effector exerts a sufficient suction or grasping force on the major surface.

9. The method of claim 5, wherein the actuator device is configured to automatically adjust the relative positioning of the magnet with respect to an edge of the stack in response to position control signals from the controller.

10. The method of claim 5, wherein positioning a magnet adjacent to a stack of the blanks includes positioning a segmented bar magnet assembly with a non-magnetic spacer, magnet north and south poles, and back-iron material.

11. A method of separating conductive non-ferrous blanks, the method comprising:
generating, via a plurality of magnets arranged with alternating north and south poles on a perimeter surface of a rotor positioned adjacent to a stack of the blanks, a magnetic field in a first direction with respect to a major surface of an uppermost blank of the stack;
producing an electric current in a second direction along the major surface of the uppermost blank by inducing the electric current in the major surface via rotation of the rotor at a calibrated speed using an actuator device, wherein the second direction is normal to the first direction;

generating a force as a product of the stationary magnetic field and the electric current to separate the uppermost blank from remaining blanks in the stack; and grasping and lifting the separated uppermost blank using an end-effector of a material handling robot.

12. The method of claim 11, wherein producing an electric current includes directly injecting current of about 100 A using a voltage source.

13. A magnetodynamic apparatus for separating conductive non-ferrous blanks arranged in a stack, the magnetodynamic apparatus comprising:

a direct current (DC) voltage source;

a pair of electrical conductors;

a pair of electrical contacts that are electrically connected to the DC voltage source via the pair of electrical conductors;

a magnet positioned adjacent to the stack, and configured to generate a stationary magnetic field in a first direction with respect to a major surface of an uppermost blank within the stack;

a controller programmed to command a flow of an electric current in a second direction along the major surface of the uppermost blank, wherein the second direction is normal to the first direction; and an actuator device connected to the magnet and operable for positioning the magnet with respect to the stack concurrently with the commanded flow of electric current such that a magnetic separation force is generated in a third direction normal to the first and second directions, and at a level sufficient for separating a portion of the uppermost blank from the stack;

wherein the electric current is produced in the second direction by injecting the electric current into the uppermost blank via the DC voltage source when the electrical leads come into direct contact with the major surface of the uppermost blank.

14. The magnetodynamic apparatus of claim 13, further comprising a switch, wherein the electric current is injected into the uppermost blank when the switch is closed after the electrical leads come into direct contact with the surface of the uppermost blank.

15. The magnetodynamic apparatus of claim 13, wherein the magnet includes a segmented bar magnet assembly with a non-magnetic spacer, magnet north and south poles, and back-iron material.

* * * * *